United States Patent [19]
Makihara et al.

[11] Patent Number: 5,983,937
[45] Date of Patent: Nov. 16, 1999

[54] FLOW CONTROL DEVICE

[75] Inventors: Masamichi Makihara, Gamagori; Kiyoshi Usami, Obu; Yoshio Miyata, Nagoya, all of Japan

[73] Assignee: Denso Corporation, Kariya, Japan

[21] Appl. No.: 08/794,968

[22] Filed: Feb. 4, 1997

[30] Foreign Application Priority Data

Feb. 5, 1996 [JP] Japan .................................. 8-019086
Jan. 10, 1997 [JP] Japan .................................. 9-002624

[51] Int. Cl.$^6$ ...................................................... F16K 5/10
[52] U.S. Cl. ...................................... 137/624.15; 251/207
[58] Field of Search ............................. 251/207, 129.12; 137/624.15

[56] References Cited

U.S. PATENT DOCUMENTS

| | | | |
|---|---|---|---|
| 582,345 | 5/1897 | Decarie | 251/207 X |
| 2,101,356 | 12/1937 | Zak | 251/207 |
| 2,196,219 | 4/1940 | Madden | 251/207 |
| 3,558,100 | 1/1971 | Hulsey | 251/207 |
| 4,391,265 | 7/1983 | Chen | 251/207 X |
| 5,443,241 | 8/1995 | Odaira et al. | |

FOREIGN PATENT DOCUMENTS

| | | |
|---|---|---|
| 62-102825 | 5/1987 | Japan . |
| 4-257007 | 9/1992 | Japan . |
| 7-10649 U | 2/1995 | Japan . |

*Primary Examiner*—John Fox
*Attorney, Agent, or Firm*—Harness, Dickey & Pierce, PLC

[57] ABSTRACT

First to third openings are formed stepwise in a rotor side wall portion of a flow control valve disposed in a hot water circuit. Third positions (a) and (b) are established between a first position in which a first communication passage for communication between inlet and outlet pipes of the flow control valve is fully closed and a second position in which the first communication passage is fully opened. A duty control is performed so that the rotor reciprocates repeatedly among the above four positions. In this way, in the flow control valve for controlling the amount of the fluid flowing in the fluid passage, the valve colliding noise, the water hammer noise, and the temperature variation in the heating heat exchanger can be reduced.

18 Claims, 19 Drawing Sheets

FIG. 4
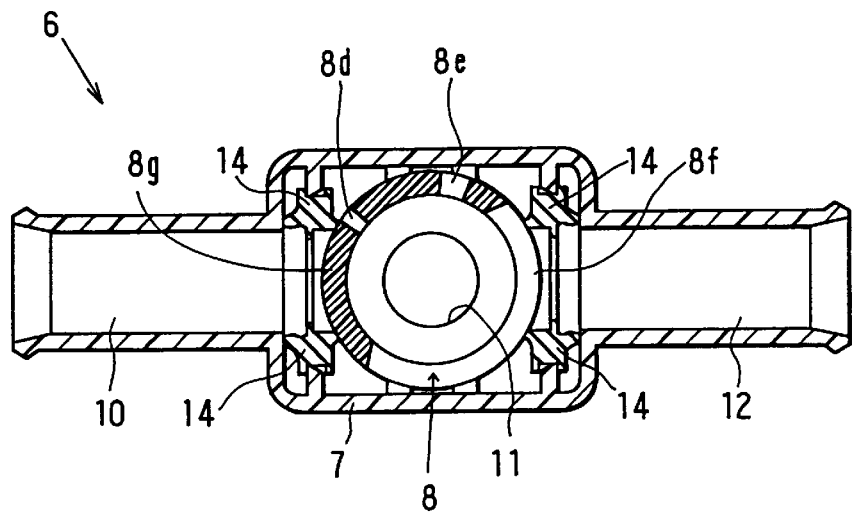
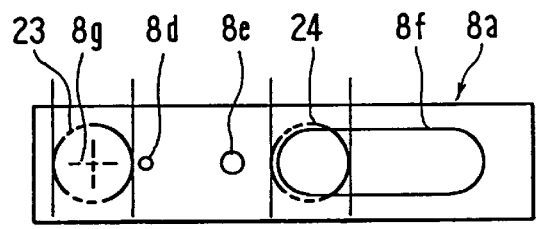
FIG. 5A
FIRST POSITION
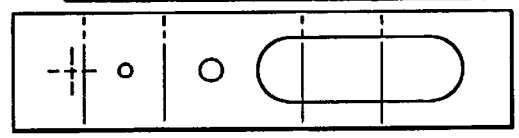
FIG. 5B
THIRD POSITION(a)
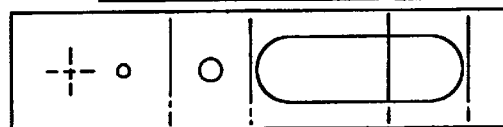
FIG. 5C
THIRD POSITION(b)
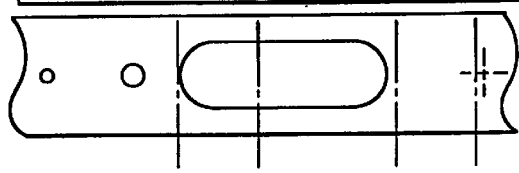
FIG. 5D
SECOND POSITION

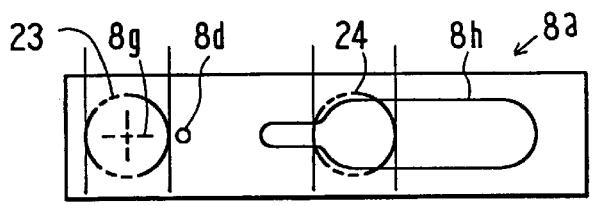
FIG. 15A
FIRST POSITION
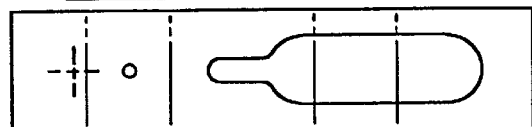
FIG. 15B
THIRD POSITION
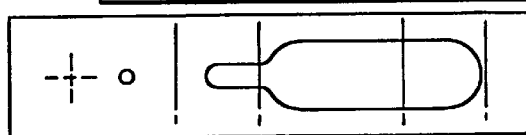
FIG. 15C
THIRD POSITION
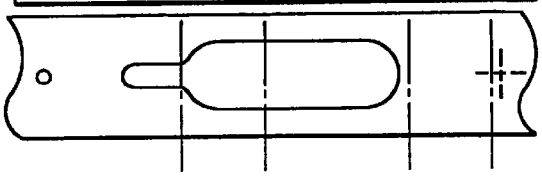
FIG. 15D
SECOND POSITION
FIG. 16
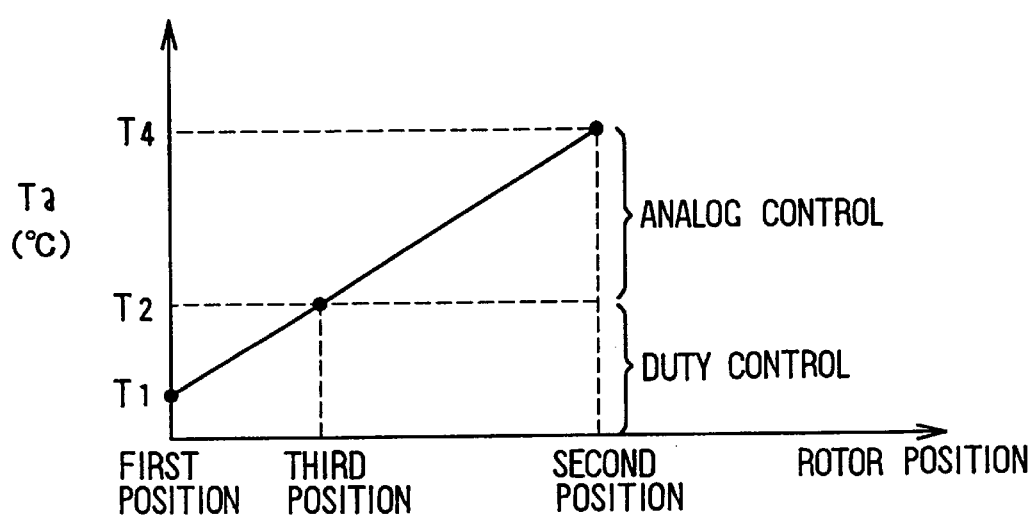

FIRST POSITION

THIRD POSITION(a)

THIRD POSITION(b)

SECOND POSITION

FIRST POSITION

THIRD POSITION(a)

THIRD POSITION(b)

SECOND POSITION

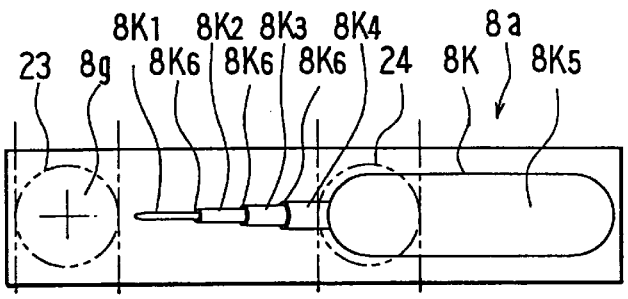
FIG. 20A
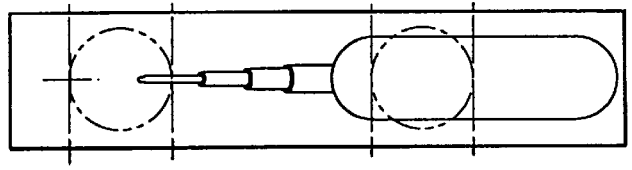
FIG. 20B
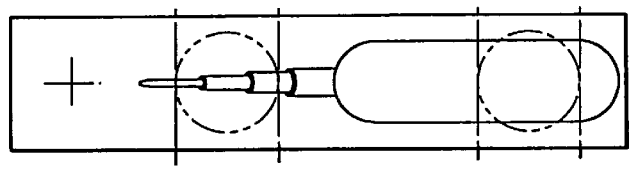
FIG. 20C
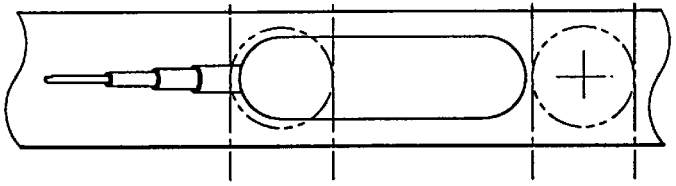
FIG. 20D
FIG. 21A
FIG. 21B
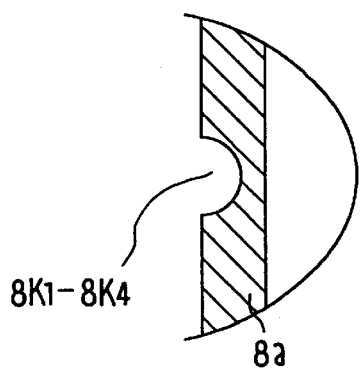
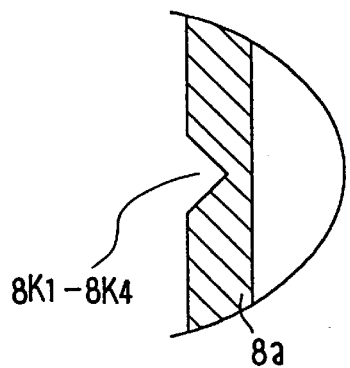

FLOW CONTROL DEVICE

REFERENCE TO THE RELATED APPLICATION

This application is based on and claims priority of Japanese Patent Application Nos. Hei. 8-19086 filed on Feb. 5, 1996 and Hei. 9-2624 filed on Jan. 10, 1997, the contents of which are incorporated herein by reference.

BACKGROUND OF THE INVENTION

1. Field of the Invention

The present invention relates to a flow control device for controlling a flow amount of a fluid flowing through a passage. Particularly, the invention is suitably employed as a flow control device for controlling the flow amount of hot water flowing from a hot water supply source to a heating heat exchanger.

2. Description of Related Art

As a flow control device for controlling the flow amount of hot water flowing from a hot water supply source to a heating heat exchanger in a hot water circuit, there has been known, for example, the flow control device disclosed in JP-A5-248558, which will be described below with reference to FIGS. 27 and 28.

As shown in FIGS. 27 and 28, in a hot water circuit 1, there are disposed a water-cooled engine 2 serving as a hot water supply source, a mechanical water pump 3 operated while interlocking with the engine 2, a heater core 4 as a heat exchanger for heating air to be blown out into the passenger compartment of a vehicle, and a motor pump 5 being operated when electric power is supplied from a battery (not shown) thereto. Further, in the hot water circuit 1, there is disposed a flow control valve 6 for adjusting the flow amount of hot water flowing from the engine 2 to the heater core 4. The numeral 100 denotes a radiator.

The flow control valve 6 includes a valve housing 101 constituting a hot water passage in the hot water circuit 1 and a solenoid portion 102 fixed to the valve housing 101. The valve housing 101 is provided with a first inlet pipe 103 and a first outlet pipe 104 both constituting a hot water passage from the engine 2 to the heater core 4, a second inlet pipe 105 and a second outlet pipe 106 both constituting a second hot water passage from the heater core 4 to the engine 2, and a bypass pipe 107 constituting a bypass passage for bypassing hot water which has entered the second inlet pipe 105 directly to the first outlet pipe 104.

A shaft 108 passes through each interior of the valve housing 101 and the solenoid portion 102. Valve elements 111 and 112 are provided on the shaft 108. By the valve elements 111 and 112, when a first communication passage 109 for communicating between the first inlet pipe 103 and the first outlet pipe 104 is fully closed, a second communication passage 110 for communication between the second inlet pipe 105 and the bypass passage 107 is fully opened. On the other hand, when the first communication passage 109 is fully opened, the second communication passage 110 is fully closed.

When the solenoid portion 102 is energized and controlled by a control unit 113, the shaft 108 comes into the state shown in FIG. 27, in which the first communication passage 109 is fully closed and the second communication passage 110 is fully open. In this state, hot water of a high temperature is not supplied from the engine 2 to the heater core 4, so that the temperature of the heater core drops. On the other hand, when the solenoid portion 102 is deenergized by the control unit, the shaft 108 comes into the state shown in FIG. 28, in which the first communication passage 109 is fully opened and the second communication passage 110 is fully closed. In this state, hot water of a high temperature is supplied from the engine 2 to the heater core 4, so that the temperature of the heater core rises.

The control unit 113 determines a predetermined duty ratio according to a target temperature of the heater core 4 and, on the basis of the thus-determined duty ratio, performs a duty control so as to reciprocate the shaft 108 repeatedly between the position shown in FIG. 27 and the position shown in FIG. 28.

In the flow control device described above, the valve elements 111 and 112 collide with valve seats when the shaft 108 moves from the position shown in FIG. 27 to the position shown in FIG. 28 and also when the shaft 108 moves from the position shown in FIG. 28 to the position shown in FIG. 27, thereby causing a problem in that the valve colliding noise is generated.

Further, since the duty control is performed between the position (FIG. 28) in which the first communication passage 109 is fully opened and the position (FIG. 27) in which the passage 109 is fully closed, when the shaft 108 shifts from the position indicated in FIG. 28 to the position indicated in FIG. 27, the first communication passage 109 in which a large amount of hot water is flowing is suddenly closed fully, thereby causing a problem in that a water hammer noise is generated.

Moreover, since the duty control is performed between the position in which the first communication path 109 is fully opened and the position in which the passage 109 is fully closed, the variation in the temperature of the heater core 4 may increase unless the duty control cycle is shortened. If the cycle is shortened, the number of operations of the shaft 108 becomes larger, thereby causing a problem in that the durability deteriorates.

SUMMARY OF THE INVENTION

It is an object of the present invention to solve the above-mentioned problems in a flow control device for controlling the flow amount of a fluid flowing through a passage.

According to the present invention, a flow control device includes a valve body for adjusting the flow amount of a fluid flowing through a fluid passage, valve operating means for operating the valve body, and control means for controlling the valve operating means. The valve body is disposed in the fluid passage movably to a predetermined position in a direction crossing the fluid passage. Openings through which the fluid passes is formed in the valve body. The valve body is operated to a position between a first position in which the fluid passage is fully closed to a second position in which the fluid passage is fully opened by any of the openings. The openings includes a small area portion which opens the fluid passage at a smaller area when the valve body is in a third position between first and second positions than when the valve body is in the second position, and the control means performs a duty control for the valve operating means so that the valve body reciprocates repeatedly between the first and the third position or between the third and the second position.

According to this construction, since the valve body is disposed movably to a predetermined position in a direction crossing the fluid passage, the valve body does not collide with the valve seat. Therefore, there will not occur a valve colliding noise when the valve body moves.

When the valve body is in the third position, a small-area portion of the openings opens the fluid passage. The opening area of the passage opened by this small-area portion is smaller than the opening area (full opening area) opened by an opening when the valve body is in the second position. The control perform a duty control for the valve operating means so that the valve body reciprocates repeatedly between the first and the third position or between the third and the second position.

In both the case where the valve body moves between the first and the third position and the case where the valve body moves between the third and the second position, the degree of variation in the flow amount of the fluid flowing through the fluid passage can be greatly reduced as compared with the case where the valve body moves between the first and the second position. According to the present invention, therefore, it is possible to solve the problems of the generation of the water hammer noise and the deterioration of the durability.

Here, the first position means a position in which no fluid passes through the fluid passage, the second position means a position in which the fluid can pass through the fluid passage at the maximum flow amount required, and the third position means a position between the first position and the second position, in which position the operation of the valve body is to be stopped at the time of performing the duty control. The third position may be a single position or may includes plural positions.

When the third position includes plural positions, the small-area portions may be formed in such a manner that the opening area of the passage is larger in a third position closer to the second position than in a third position closer to the first position, and the control means performs a duty control for the valve body operating means so that the valve body reciprocates repeatedly also between the plural third positions.

According to this construction, it is possible to perform a minute flow control.

Further, the valve body may be constituted by a rotor disposed in a valve housing forming a part of said fluid passage.

Still further, the small-area portion may be formed as an independent fine opening corresponding to the third position. Accordingly, in the case of the single third position, there is a single fine opening, and in the case of plural third positions, there are plural fine openings.

Further, the small-area portion may include an opening of a groove shape formed along an outer surface of said valve body.

In this way, the foreign materials contained in the fluid can be easily discharged along the groove shape formed on the outer surface of the valve body, thereby preventing the deterioration of the flow control function due to the clogging of the foreign materials.

Still further, in the opening of the groove shape, the connecting portion, a groove width and a groove depth of which are increased stepwise, may be formed as a tapered portion, or a cross section of the opening of the groove shape may be formed in an arcuate shape or triangular shape.

Further, the control means may perform a duty control for the valve body operating means so that the valve body reciprocates repeatedly between adjacent positions out of said first to third positions.

Accordingly, when the third position is single, the control means performs a duty control for the valve body between the first position and the third position and between the third position and the second position. When the third position includes plural positions, the control means respectively performs a duty control for the valve body between the first position and the third position which is the closest to the first position, between the adjacent third positions, and between the third position which is the closest to the second position and the second position.

Still further, the control means may perform a duty control for the valve body operating means so that the valve body reciprocates repeatedly between one of adjacent positions out of the first to third positions and further perform an analog control for the valve body operating means so that the valve body reciprocates repeatedly between the other adjacent positions out of the first to third positions.

The present invention can be employed by using the combination of the duty control and the analog control.

Further, the fine opening of the smallest area may be formed in a size through which a foreign material (e.g. die-casting sand) in the hot water circuit can pass, and the control means performs the duty control between the first position and a position corresponding to the fine opening of the smallest area.

According to this construction, in the case of a single third position, a fine opening formed corresponding to the third position is the fine opening of the smallest area. In the case of plural third positions, a fine opening formed corresponding to the third position closest to the first position is the fine opening of the smallest area.

Therefore, when a target flow amount of fluid flowing through the fluid passage is extremely small, the duty control is performed between the first position and the position corresponding to the fine opening of the smallest area. However, since the fine opening of the smallest area is of a size through which a foreign material in the hot water circuit can pass, it is possible to perform a fine control for the flow amount of hot water without the opening being clogged with the foreign material.

Further, the flow amount of hot water flowing from a hot water supply source to a heat exchanger for heating may be controlled by the flow control device according to the present invention.

In this way, the generation of a valve colliding noise of the valve body can be suppressed and the water hammer noise can be diminished. Further, the temperature variation of the heater core can reduced in the case where the duty control cycle is the same as in the prior art. In other words, if the temperature variation is of the same width as in the prior art, the number of operations of the valve body can be reduced.

The invention defined in claim 6 is characterized in that the small-area portions are formed as independent fine opening or openings in corresponding relation to the third position or positions.

In the case of a single third position, there is formed one such fine opening as referred to above, and where plural third positions are present, there are formed plural such fine openings as referred to above.

BRIEF DESCRIPTION OF THE DRAWINGS

Additional objects and advantages of the present invention will be more readily apparent from the following detailed description of preferred embodiments thereof when taken together with the accompanying drawings in which:

FIG. 4 is a cross sectional view taken along the line IV—IV of FIG. 3;

FIGS. 5A to 5D are developed views of a rotor in the first embodiment;

FIGS. 15A to 15D are developed views of a rotor in a second embodiment;

FIG. 16 is a graph showing a relationship between the position of the rotor and the detection value Ta in the second embodiment;

FIGS. 20A to 20D are developed views for showing the rotor 8 of the fourth embodiment;

FIGS. 21A and 21B are cross sectional views for showing the opening formed of a groove shape disposed at the rotor 8 of the fourth embodiment;

DETAILED DESCRIPTION OF THE PREFERRED EMBODIMENTS

A first embodiment of the present invention will be described.

Figure 19:
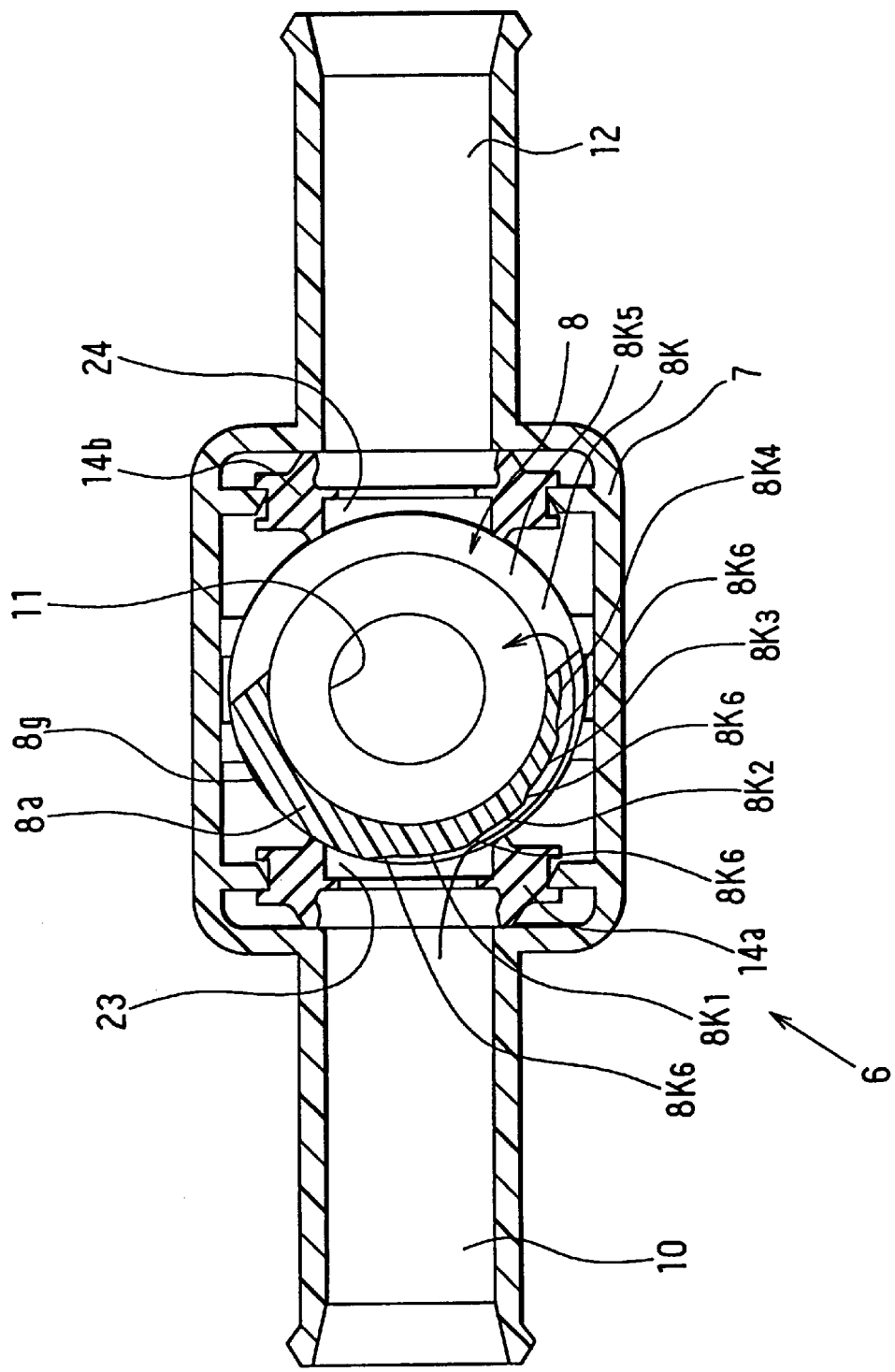
FIG. 19 is a cross sectional view of the flow control valve 6 of a fourth embodiment of the present invention.

A flow control device according to the first embodiment of the present invention will be described below with reference to FIGS. 1 to 14, which is used for controlling the flow amount of hot water flowing from an engine for a vehicle to a heater core. The components which are same or equivalent to those in FIGS. 19 and 20 are indicated with the same reference numerals and detailed explanations thereof will be omitted.

Figure 1:
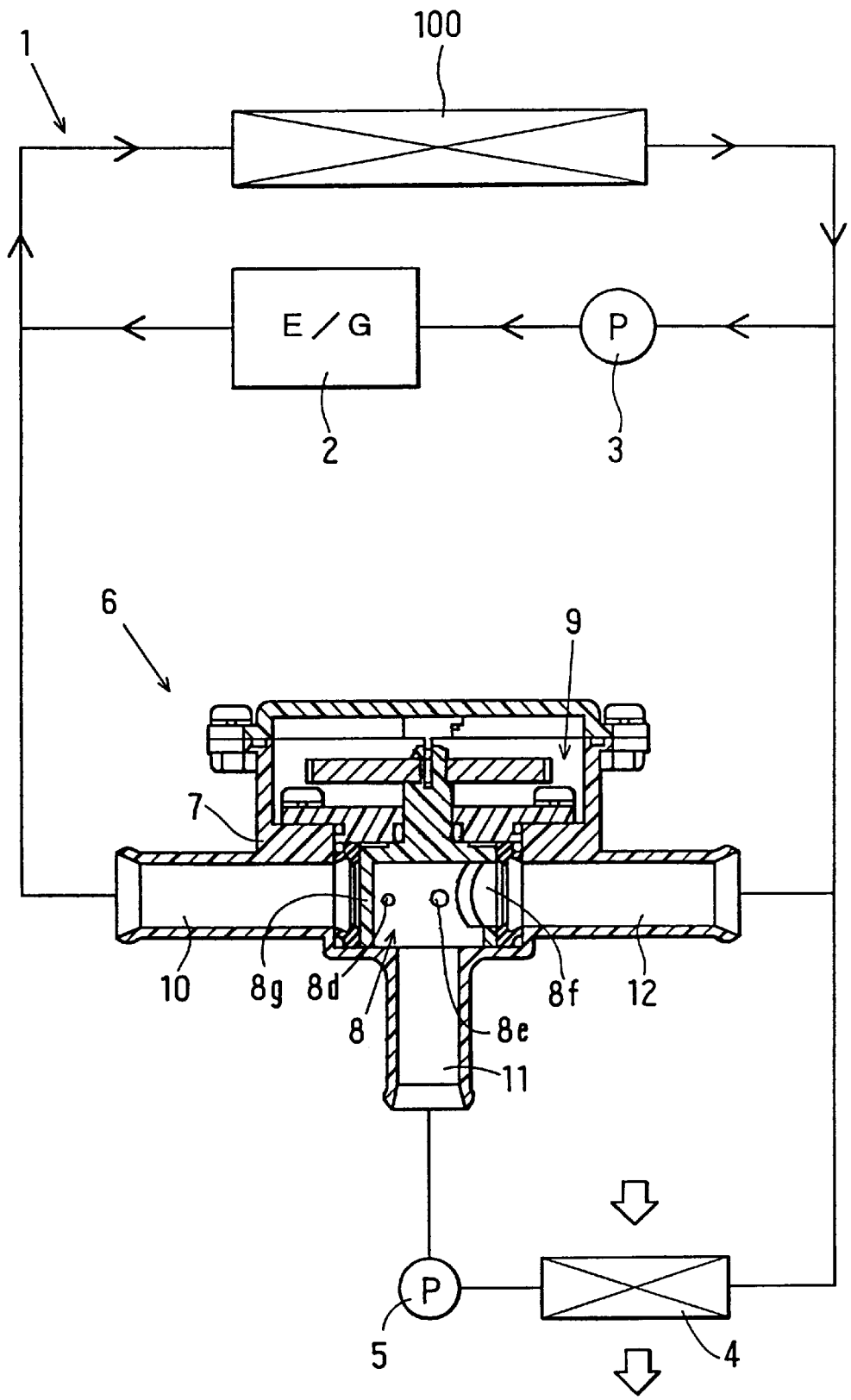
FIG. 1 is a schematic diagram of a hot water circuit 1 used in the first embodiment of the present invention.

As shown in FIG. 1, in a hot water circuit 1, there are disposed a water-cooled engine 2 serving as a hot water supply source, a water pump 3, a heater core 4 as a heat exchanger for heating air to be blown out into the passenger compartment of the vehicle, and a motor pump 5. In the hot water circuit 1, there is provided a flow control valve 6 for adjusting the flow amount of hot water flowing from the engine 2 to the heater core 4.

Figure 2:
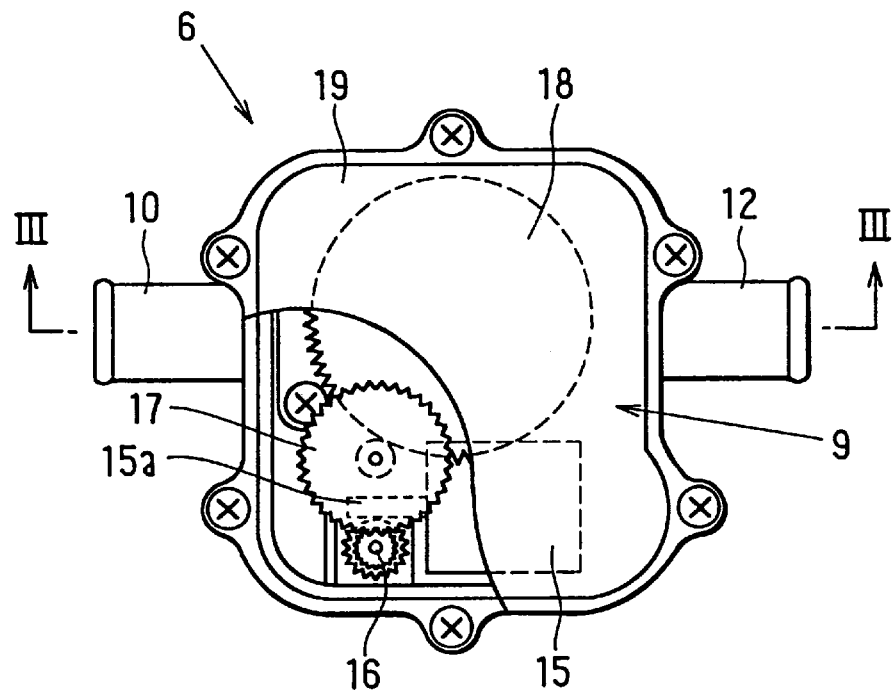
FIG. 2 is a top view of a flow control valve 6 used in the first embodiment.
Figure 3:
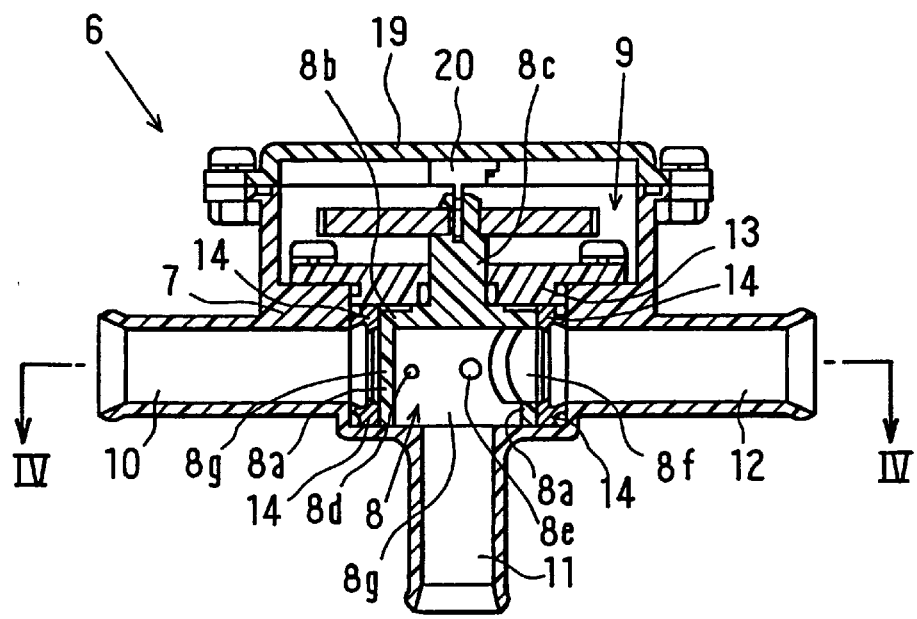
FIG. 3 is a cross sectional view taken along the line III—III of FIG. 2.

The construction of the flow control valve 6 will be described below in detail with reference to FIGS. 1 to 5. FIG. 2 is a top view of the flow control valve 6 as seen from the top side in FIG. 1, showing an outer cover 19 in a partly broken-away condition. FIG. 3 is a cross sectional view taken along the line III—III of FIG. 2, FIG. 4 is a cross sectional view taken along the line IV—IV of FIG. 3, and FIG. 5 is a developed view of a side wall portion 8a of a rotor 8.

The flow control valve 6 is provided with a valve housing 7, a rotor 8, and an actuator 9.

The valve housing 7 is provided with an inlet pipe 10 and an outlet pipe 11 both constituting a hot water passage extending from the engine 2 to the heater core 4, and a bypass pipe 12 constituting a bypass passage for bypassing hot water from the heater core 4 directly to the outlet pipe 11.

The rotor 8 is provided with a cylindrical side wall portion 8a, a disc-like upper surface portion 8b and a rotary shaft portion 8c formed so as to protrude from the center of the upper surface portion 8b. The side wall portion 8a, the upper surface portion 8b, and the rotary shaft portion 8c are integrally formed with a resin. The bottom of the rotor 8 is open. The side wall portion 8a is rotatably disposed in the valve housing 7 with the rotary shaft portion 8c so as to cross the flowing direction of hot water in the inlet pipe 10 and the bypass pipe 12.

The side wall portion 8a is formed with a first opening 8d having a size through which a foreign material (e.g., die-cast sand) in the hot water circuit 1 can pass, a second opening 8e having a size larger than that of the first opening 8d, and a third opening 8f having a size larger than that of the second opening 8e, which substantially fully opens the inlet pipe 10 and bypass pipe 12.

An inner cover 13 partitioning between the rotor 8 and the actuator 9 is attached to the valve housing 7, so that the rotor 8 is prevented from being displaced in the vertical direction. Between the side wall portion 8a and the valve housing 7 is disposed rubber packings (elastic sealing member) 14. The rubber packings 14a and 14b in contact with the side wall portion 8a and the valve housing 7 at an appropriate surface pressure to prevent internal leakage of the hot water.

Each of the rubber packings 14 is formed so as to have a round passage hole in a center thereof. Out of round passage holes of the rubber packings 14, the portions facing the side wall portion 8a of the rotor 8 constitute a first communication passage 23 and a second communication passage 24, respectively.

The actuator portion 9 includes a DC motor 15, a first reduction gear 16 engaging with a worm gear 15a on an output shaft of the DC motor 15, a second reduction gear 17 engaging with the first reduction gear 16, and an output gear 18 engaging with the second reduction gear 17 and centrally fitted on the upper end of the rotary shaft portion 8c. These components of the actuator portion 9 are disposed in a space between the inner cover 13 and the outer cover 19. A potentiometer 20 for detecting a rotational position of the rotor 8 is connected to the upper end of the rotary shaft portion 8c.

Figure 6:
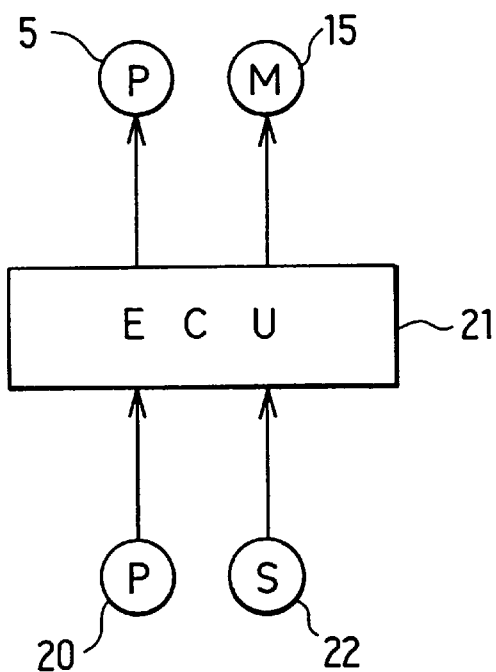
FIG. 6 is a block diagram of a control system in the first embodiment.

The configuration of a control system will be described below with reference to FIG. 6.

An ECU (electronic control unit) 21 is provided with a known microcomputer composed of a CPU, a ROM, a RAM, etc. (not shown). When an ignition switch (not shown) for the engine 2 is turned ON, electric power is supplied to the ECU 21 from a battery (not shown).

To input terminals of the ECU 21 are electrically connected the potentiometer 20 and a temperature sensor 22 for detecting the temperature of the heater core 4 (more particularly, detecting the temperature of air immediately after passing through the heater core 4).

Signals from the potentiometer 20 and the temperature sensor 22 are converted from analog to digital by means of an A/D converter (not shown) provided in the ECU 21, and the digital signals are output to the microcomputer.

To output terminals of the ECU 21 are electrically connected the motor pump 5 and the DC motor 15.

The ECU 21 performs a duty control for the DC motor 15 so that the rotor 8 reciprocates repeatedly between adjacent positions among four positions in total, which are a first position, a third position (a), a third position (b), and second position as shown in FIGS. 5A to 5D, respectively. In each of those positions, the relationship between the position of the rotor 8 and the flow of hot water in the hot water circuit 1 will be described below with reference to FIGS. 1, 4, 5 and 7–13.

(First Position)

In the first position, the rotor 8 is in the position shown in FIGS. 1 and 4, in which a first communication passage 23 for communication between the inlet pipe 10 and the outlet pipe 11 is fully closed by the shut-off portion 8g, as illustrated in FIG. 5A. On the other hand, a second communication passage 24 for communication between the bypass pipe 12 and the outlet pipe 11 is fully open by the third opening 8f.

When the rotor 8 stops in the first position, the CPU 21 turns off the motor pump 5. At this time, therefore, hot water from the engine 2 flows into only the radiator 100 and does not flow into the heater core 4, as indicated with arrows in FIG. 1. When performing the duty-control of the DC motor 15, the CPU 21 turns on the motor pump 5.

Figure 7:
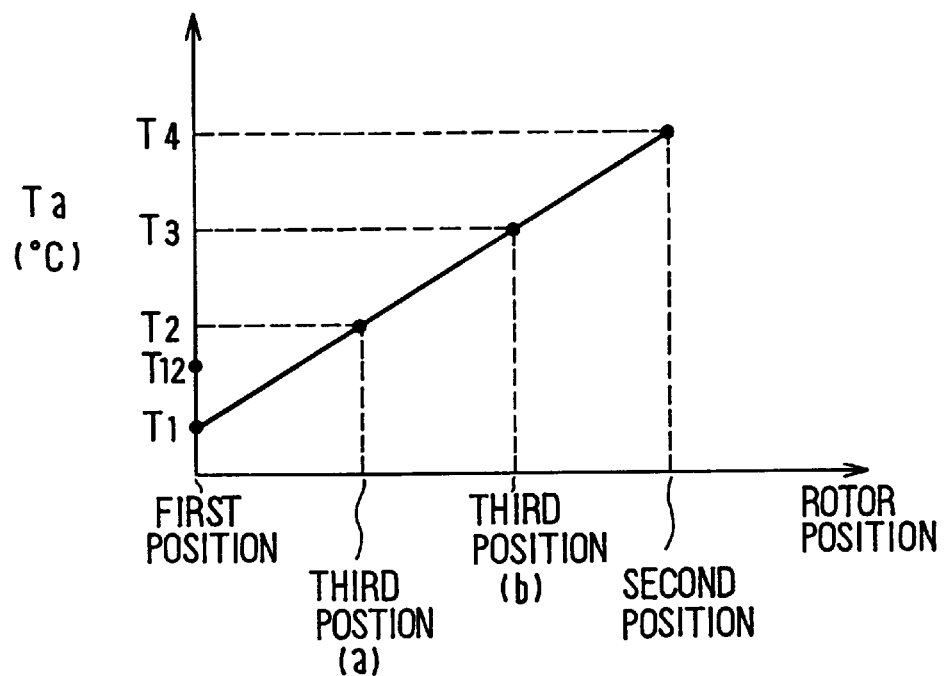
FIG. 7 is a graph showing a relationship between the position of a rotor and a detection value Ta from a temperature sensor in the first embodiment.

Accordingly, at this time, a detection value Ta from the temperature sensor 22 becomes T1 as in FIG. 7. As a result, the temperature of the air blown out into the passenger compartment of the vehicle becomes in the maximum cooling state.

(Third Position (a))

Figure 8:
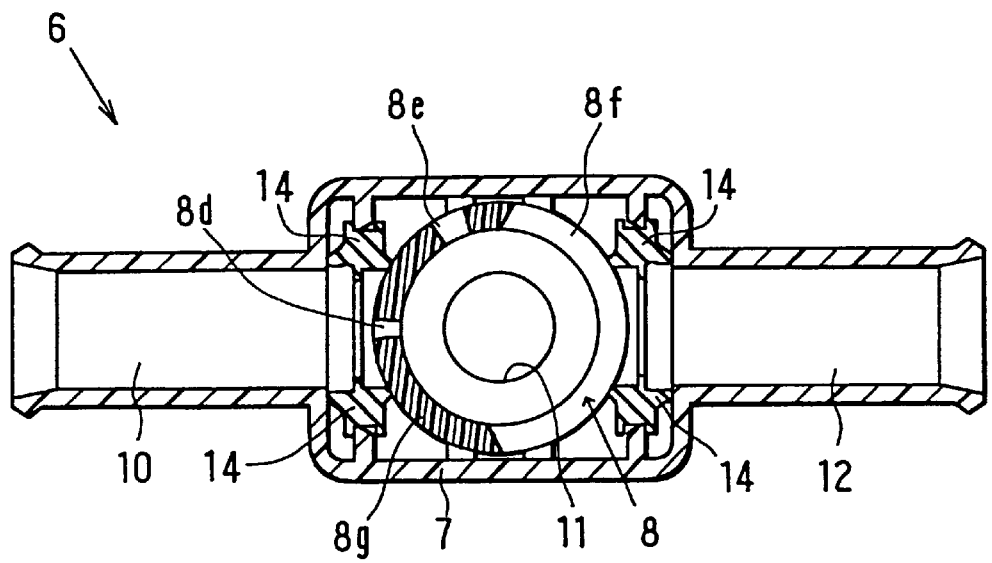
FIG. 8 is a view similar to FIG. 4, in which the rotor 8 is in the third position (a)

In the third position (a), the rotor 8 is in the position shown in FIG. 8, in which, as shown in FIG. 5B, the first communication passage 23 is slightly opened by the first opening 8d, while the second communication passage 24 is fully opened by the third opening 8f.

Figure 9:
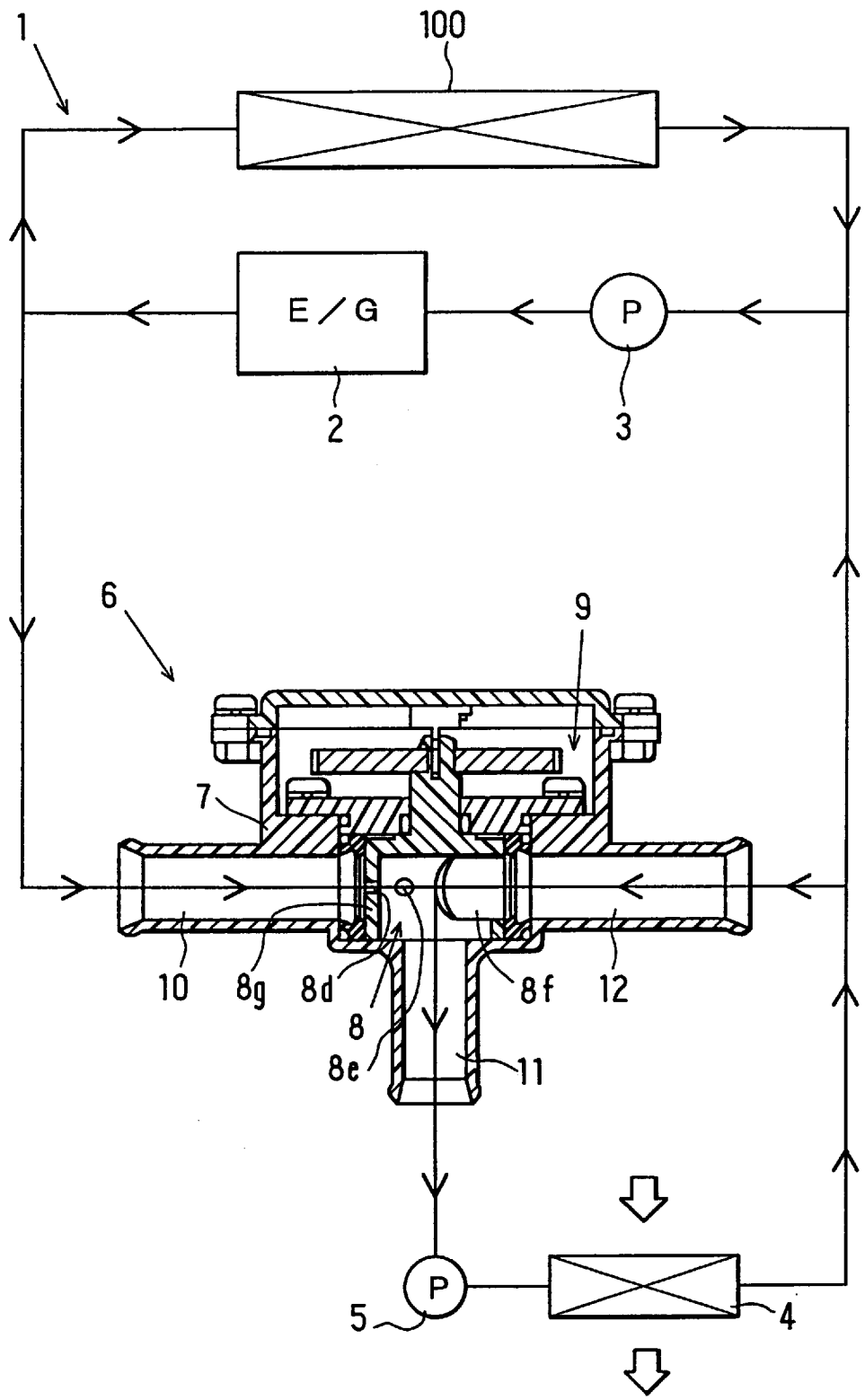
FIG. 9 is a view similar to FIG. 1, in which the rotor 8 is in the third position (a)

At this time, as indicated with arrows in FIG. 9, hot water of a high temperature from the engine 2 naturally flows into the radiator 100, and a small amount thereof flows into the heater core 4. At the same time, hot water of a low temperature, having flowed out of the heater core 4, flows into the bypass pipe 12 and the outlet pipe 11, and enters the heater core 4 again.

Consequently, the detection value Ta from the temperature sensor 22 becomes T1 which is higher than T2, as shown in FIG. 7.

(Third Position (b))

Figure 10:
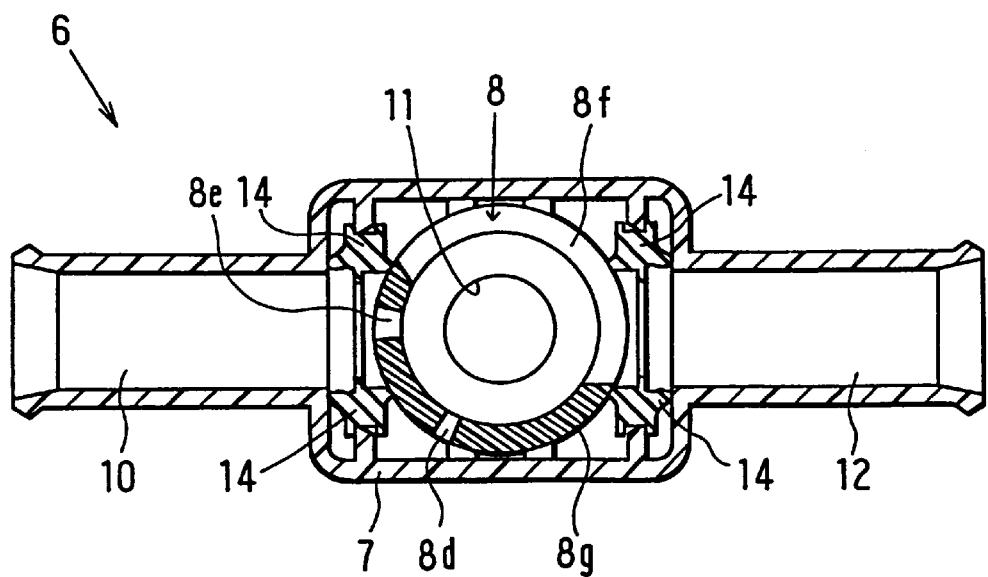
FIG. 10 is a view similar to FIG. 4, in which the rotor 8 is in the third position (b)

In the third position (b), the rotor 8 is in the position shown in FIG. 10, in which, as shown in FIG. 5C, the first communication passage 23 is opened with a larger area as compared with as in FIG. 5B, while the second communication passage 24 is fully opened by the third opening 8f.

Figure 11:
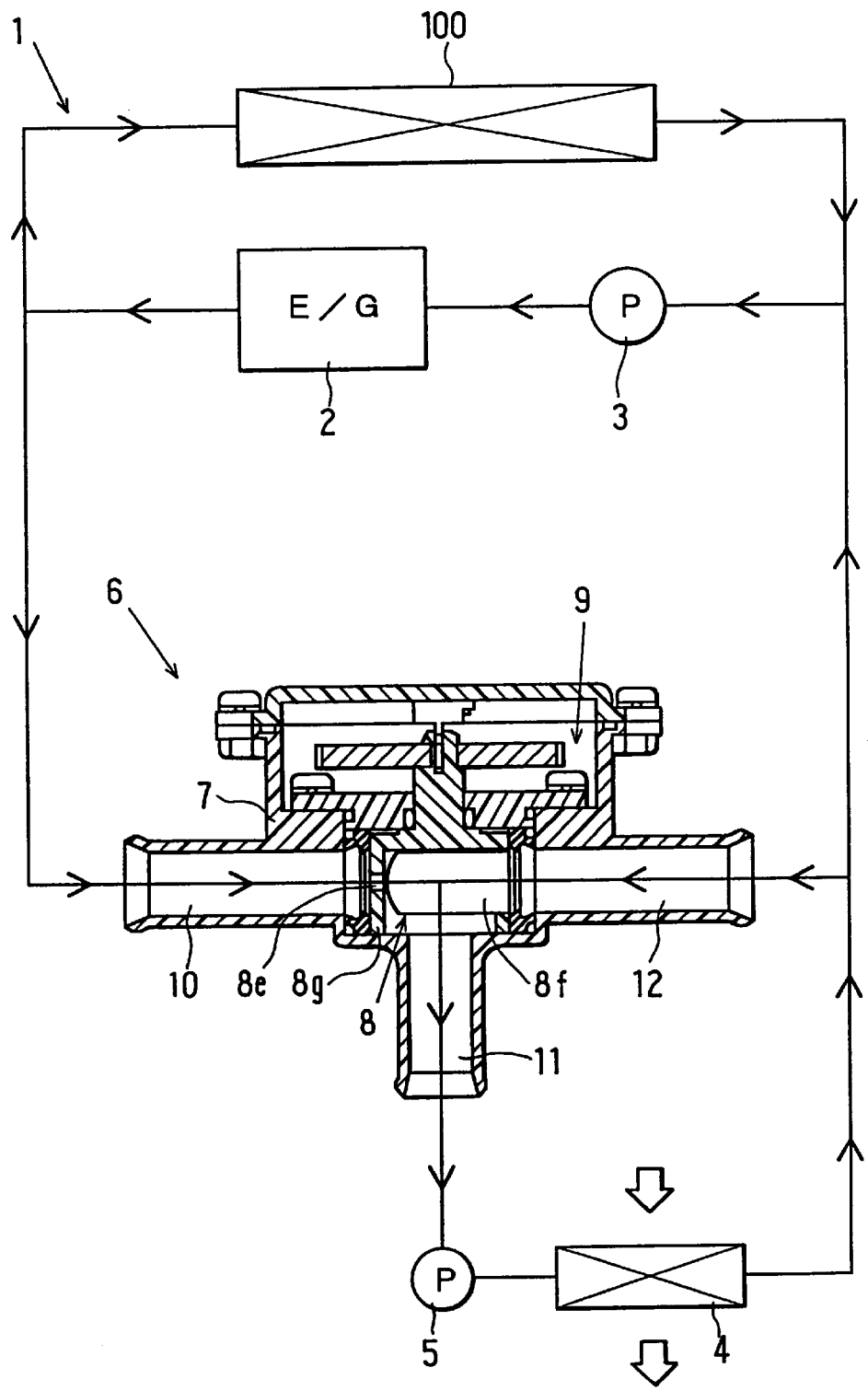
FIG. 11 is a view similar to FIG. 1, in which the rotor 8 is in the third position (b)

At this time, as indicated with arrows in FIG. 11, hot water of a high temperature from the engine 2 naturally flows into the radiator 100, and a larger amount thereof as compared with as in FIG. 9 also flows into the heater core 4. At the same time, hot water of a low temperature, having flowed out of the heater core 4, flows into the bypass pipe 12 and the outlet pipe 11, and enters the heater core 4 again.

(Second Position)

Figure 12:
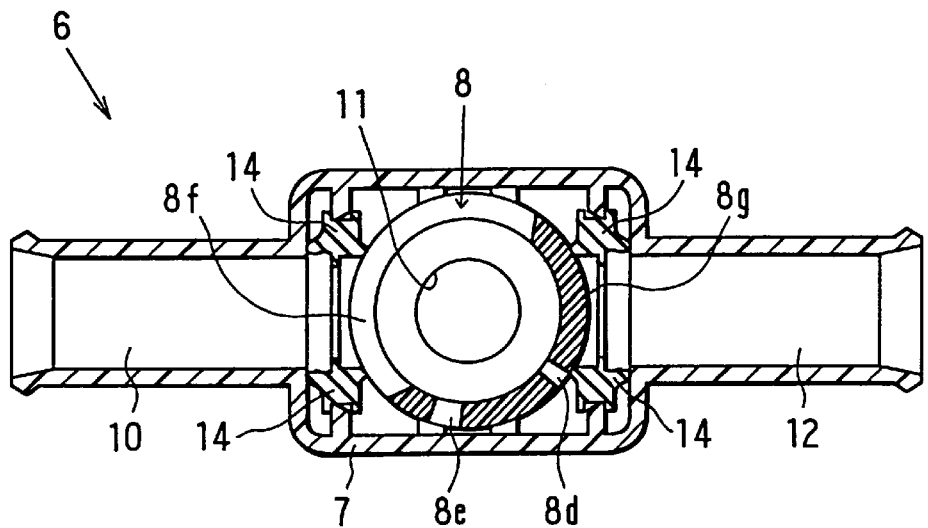
FIG. 12 is a view similar to FIG. 4, in which the rotor 8 is in the second position.

In the second position, the rotor 8 is in the position shown in FIG. 12, in which, as shown in FIG. 5D, the first communication passage 23 is fully opened by the third opening 8f, while the second communication passage 24 is fully closed by the shut-off portion 8g.

Figure 13:
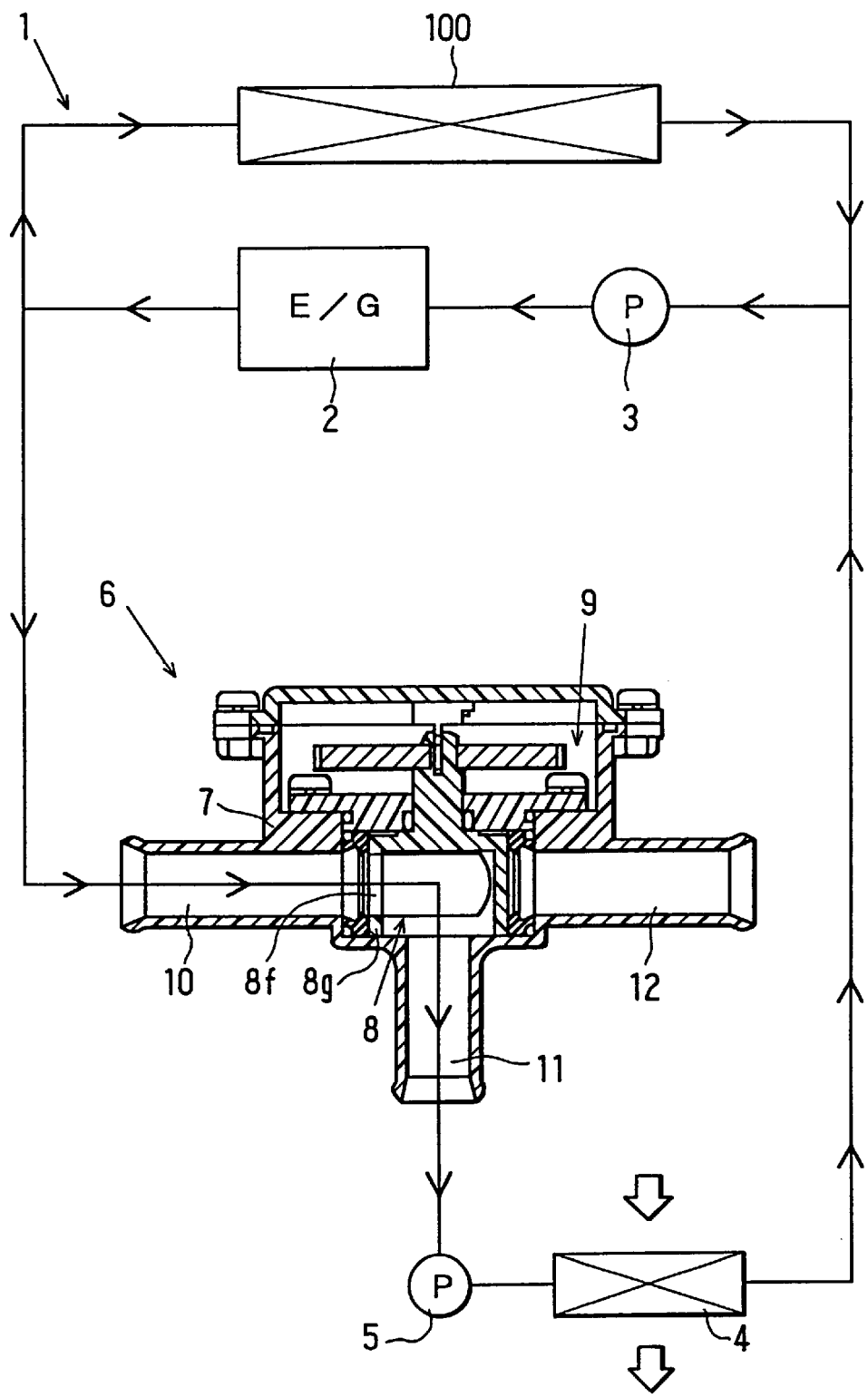
FIG. 13 is a view similar to FIG. 1, in which the rotor 8 is in the second position.

At this time, as indicated with arrows in FIG. 13, hot water of a high temperature from the engine 2 naturally flows into the radiator 100 but also through the heater core 4 to such an extent as to obtain the maximum heating capacity. At the same time, hot water of a low temperature, having flowed out of the heater core 4, flows back directly to the engine 2 without flowing into the heater core again through the bypass pipe 12 and the outlet pipe 11.

Consequently, the detection value Ta from the temperature sensor 22 becomes the maximum temperature T4 as in FIG. 7, so that the temperature of the air blown out into the passenger compartment of the vehicle becomes in the maximum heating state.

Thus, the detection value Ta from the temperature sensor 22 takes such values as shown in FIG. 7 in correspondence to the above positions. If the target temperature of the heater core 4 is in a range between T1 and T2, the ECU 21 determines appropriately a duty ratio on the basis of the target temperature. Then, on the basis of the duty ratio, the ECU performs a duty control for the DC motor 15 so that the rotor 8 reciprocates repeatedly between the first position and the third position (a).

Figure 14:
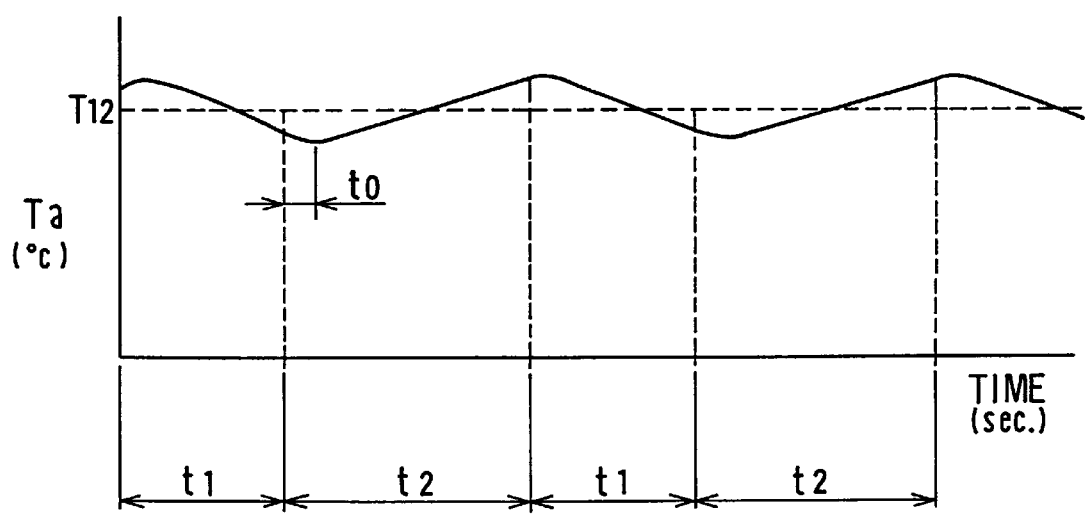
FIG. 14 is a graph showing a variation in the detection value Ta when a duty control of the rotor is actually performed.

For example, if the target temperature of the heater core 4 is T12 in FIG. 7, the ECU 21 determines the duty ratio as in FIG. 14 on the basis of the target temperature T12. More specifically, the ECU 21 sets the period of time for stopping the rotor 8 at the first position to t1 (second) and the period of time for stopping the rotor at the third position (b) to t2 second), then performs a duty control for the DC motor 15 in accordance with the duty ratio. In FIG. 14, the deviation of time t0 is caused by the flow path length between the heater core 4 and the flow control valve 6 in the hot water circuit or the response delay due to the influence of the thermal capacity of the heater core 4.

Likewise, if the target temperature of the heater core 4 is in a range between T2 and T3, the ECU 21 determines appropriately a duty ratio on the basis of the target temperature and performs a duty control for the DC motor 15 between the third position (a) and the third position (b) in accordance with the said duty ratio. If the above target temperature is in the range between T3 and T4, the ECU 21 determines appropriately a duty ratio on the basis of the target temperature and performs a duty control for the DC motor 15 between the third position (b) and the second position in accordance with the said duty ratio.

According to this embodiment, as described above, since the rotor 8 is disposed rotatably to a predetermined position within the valve housing 7 in such a manner that the side wall portion 8*a* crosses the flowing direction of the hot water in the inlet pipe 10 and the bypass pipe 12, the phenomenon where the valve body collides with the valve seat does not occur, nor there does not occur the problem in that a valve colliding noise is generated with rotation of the rotor 8.

Moreover, the third positions (a) and (b) are established between the first and second positions and the duty control for the DC motor 15 is performed so that the rotor 8 reciprocates repeatedly between the first and the third position (a), between the third position (a) and the third position (b), and between the third position (b) and the second position. Therefore, as compared with the case where the duty control is performed so that the rotor 8 reciprocates repeatedly between the first and the second position, the variation in the flow amount can be reduced, and the water hammer noise can be reduced.

Further, according to the flow control device of this embodiment, as compared with the case where the duty control is performed so that the rotor 8 reciprocates repeatedly between the first and the second position, the variation in the temperature of the heater core 4 is reduced, in the case that both are the same in the duty control cycle (t1+t2 in FIG. 14). Therefore, in this embodiment, as compared with the case where the duty control is performed so that the rotor 8 reciprocates repeatedly between the first and the second position, the number of operations of the rotor 8 is reduced, in the case that both are set in the same range of the variation in the temperature.

Further, since the first opening 8*d* is formed to the extent that a foreign material can pass therethrough (e.g., die-cast sand) in the hot water circuit 1, the problem in that the interior of the flow control valve 6 is clogged up with the foreign material can be prevented even in an extreme small flow control area in which an extreme small amount of the hot water from the engine 2 passes through the heater core 4, e.g., the area in which duty control is performed between the first position and the third position (a).

Further, since the first and second openings 8*d* and 8*e* are formed independently in correspondence to the third position (a) and the third position (b), respectively, even if the rotor 8 stops at a position slightly deviated from the third position (a) or (b) due to the deterioration of the stop position accuracy or the like at the time of performing the duty control between the first position and the third position (a), between the third positions (a) and (b), and between the third position (b) and the second position, it is possible to maintain constant the flow amount of the hot water flowing from the engine 2 to the heater core 4.

A second embodiment of the present invention will be described below with reference to FIGS. 15 and 16.

In this embodiment only one position is established as the third position. The ECU 21 performs a duty control for the DC motor 15 so that a rotor 8 reciprocates repeatedly between the first position shown in FIG. 15A and the third position shown in FIG. 15B. Between the third position and the second position shown in FIG. 15D the ECU performs an analog control so that the rotor 8 stops at any positions between both positions.

In the side wall portion 8*a* of the rotor 8, therefore, a first opening 8*d* is formed in correspondence to the third position. The size of the first opening 8*d* is the same as that of the first opening 8*d* formed in the first embodiment. Also formed in the side wall portion 8*a* is a second opening 8*h* so that the opening area of the first communication passage 23 becomes larger gradually as the rotor 8 rotates from the third position to the second position.

In this second embodiment, the same effect as in the first embodiment can be obtained.

A third embodiment of the present invention will be described.

Figure 17A:
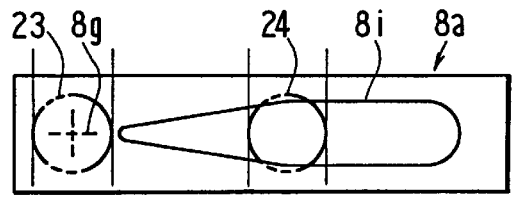
FIGS. 17A to 17D are developed views of a rotor in a third embodiment of the present invention.
Figure 17B:
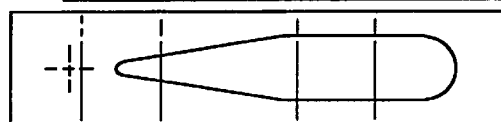
Figure 17C:
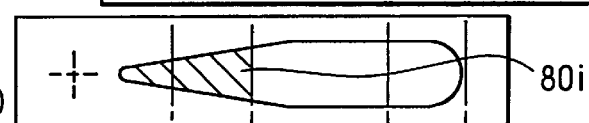
Figure 17D:
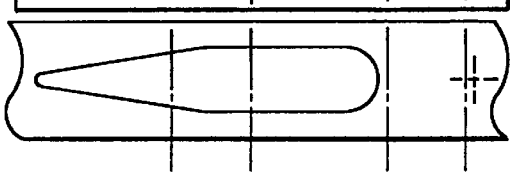
Figure 18A:
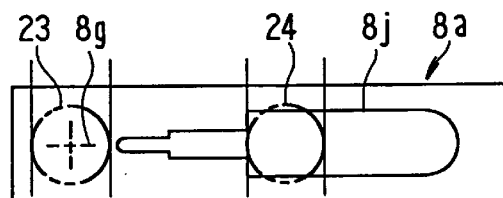
FIGS. 18A to 18D are developed views of another shape of a rotor 8 in the third embodiment of the present invention.
Figure 18B:
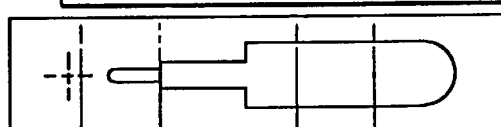
Figure 18C:
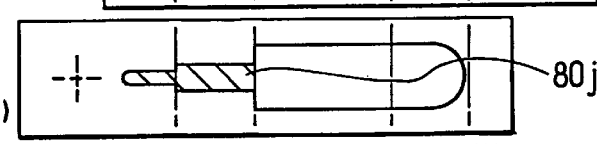
Figure 18D:
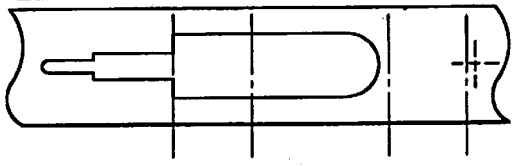

In the first and second embodiments, independent minute opening or openings are formed in correspondence to the third position or positions; however, according to the third embodiment as shown in FIGS. 17 and 18, continuous openings 8*i* and 8*j* are formed and the small-area portions are constituted by hatched portions 80*i* and 80*j* of the openings 8*i* and 8*j* as in FIGS. 17C and 18C. In this case, the duty control may be performed between each of positions as in the first embodiment or the combination of the duty control and the analog control may be employed as in the second embodiment.

A fourth embodiment of the present invention will be described with reference to FIGS. 19 to 23.

In the above first to third embodiments, openings 8*d* to 8*f*, 8*h* to 8*j* at a side wall portion 8*a* of a rotor 8 are constructed as holes passing through the side wall portion 8*a*; however, in the fourth embodiment, as an opening disposed at the side wall portion 8*a* of the rotor 8, an opening 8*k* having a groove shape extending along an outer circumferential surface of the side wall portion 8*a* of the rotor 8 is formed.

Figure 24A:
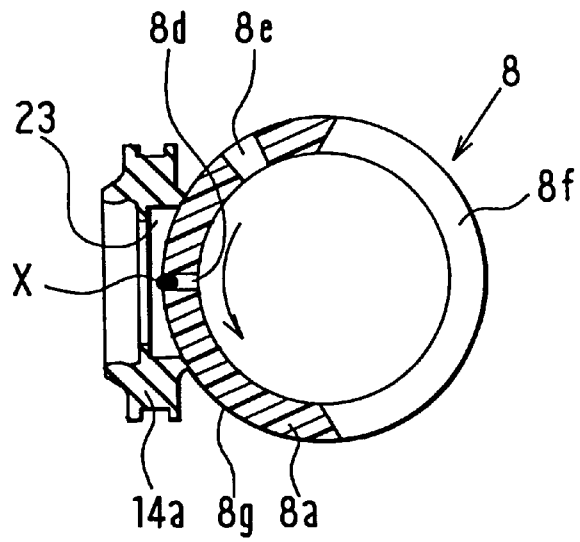
FIGS. 24A to 24C are cross sectional views for showing the rotor 8, which illustrates a discharging characteristic of the foreign materials in the first to third embodiments.
Figure 24B:
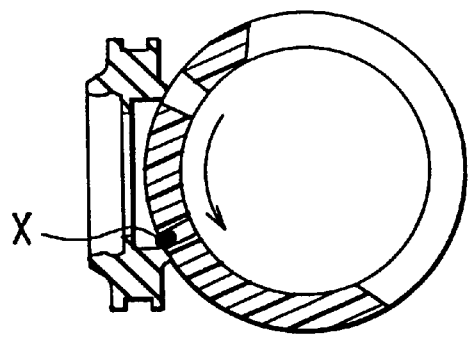
Figure 24C:
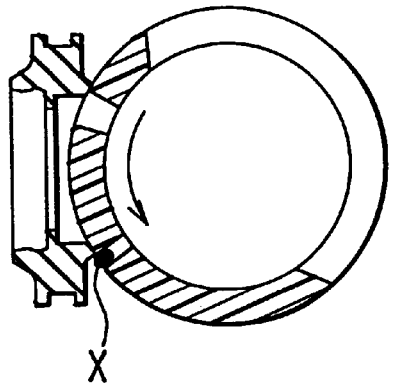

In the above first to third embodiments, the openings 8*d* to 8*f*, 8*h* to 8*j* are constructed as through-holes formed at the side wall portion 8*a*, so that as shown in FIG. 24, when foreign materials X (die-cast sand and the like in a hot water circuit) larger than a hole diameter of the first opening 8*d* flow into the first opening 8*d* constituting a minimum area portion. The foreign materials are clogged in the first opening 8*d* and are not discharged even if the rotating position of the rotor 8 is changed, so that a flow amount of the hot water may not be controlled favorably.

In order to prevent this phenomenon, a hole diameter of the first opening 8*d* may be set larger than that of the foreign materials which may flow into the opening. However, when the diameter is set larger, a flow amount of hot water during opening of the first opening 8*d* may be increased more than a desired value, thereby deteriorating a flow amount controlling characteristic.

As a result, it is difficult to obtain concurrently the prevention of the clogging at the opening of small area caused by flowing of the foreign materials and the setting a desired flow amount controlling characteristic at the openings 8*d* to 8*f*, and 8*h* to 8*j* having the through-hole shape in accordance with the first to the third embodiments.

In view of this fact, the fourth embodiment of the present invention employs a shape of the opening capable of easily discharging the foreign materials even if the foreign materials mixed in the hot water flow into the opening.

In the fourth embodiment, as shown in FIGS. 19 to 23, the opening 8*k* having a groove-shaped portion extending along an outer circumferential surface of the side wall portion 8*a* of the rotor 8 is constructed in the side wall portion 8*a*. This opening 8*k* will be described in detail. As shown in a developed view of the rotor in FIG. 20, the opening 8*k* is composed of the first to fifth openings $8k_1$ to $8k_5$. The first opening $8k_1$ to the fourth opening $8k_4$ are constructed by a groove-shape, and a groove width and a groove depth (in other words, an opening area) are increased in sequence in a stepwise manner from the first opening $8k_1$ toward the fourth opening $8k_4$.

Accordingly, the first opening $8k_1$ corresponds to the first opening $8d$ of the minimum opening area in the first and second embodiments. Further, the fifth opening $8k_5$ has a through-hole shape passing through the cylindrical side wall portion $8a$ and corresponds to the third opening $8f$ of the maximum opening area in the first embodiment.

Then, a connecting portion between the first opening $8k_1$ to the fourth opening $8k_4$ of the groove shape and another connecting portion between the first opening $8k_1$ and the outer circumferential surface of the side wall portion $8a$ are not formed as a stepped portion as shown in FIG. 19, but these portions are formed into a gradual tapered portion $8k_6$, thereby favorably discharging the foreign materials such as die-cast sand and the like in the hot.

In addition, in order to further improve the discharging performance of the foreign materials, it is preferable that the first opening $8k_1$ to the fourth opening $8k_4$ of the groove shape are formed into an arcuate cross section shape having a smooth curved surface as shown in FIG. 21A or formed into a triangular cross section shape where it is gradually narrowed toward the groove bottom portion as shown in FIG. 21B.

If the cross section of the groove is rectangular, the foreign materials are engaged with the corner portion of the rectangular shape in cross section so that the foreign materials cannot be discharged favorably. However, if the cross section of the groove is arcuate or triangular as shown in FIGS. 21A and 22B, the possibility where the foreign materials are engaged with the corner is reduced, thereby discharging the foreign materials favorably.

Figure 22A:
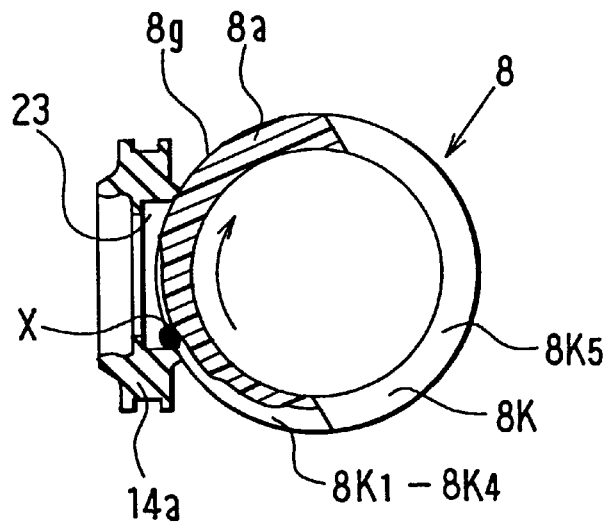
FIGS. 22A to 22C are cross sectional views for showing the rotor 8, which illustrates a discharging characteristic of the foreign materials in the fourth embodiment.
Figure 22B:
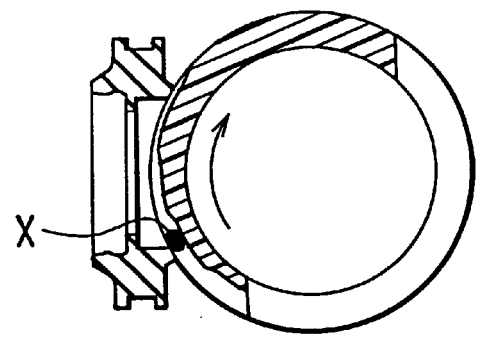
Figure 22C:
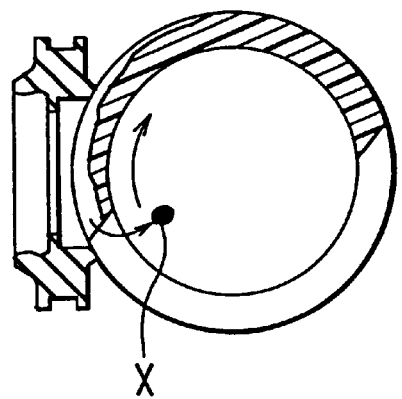

FIG. 22A shows a state in which the foreign materials X such as die-cast sand or the like in the hot water are flowed into the second opening $8k_2$ when a rotating position of the rotor 8 is placed at a small degree of opening, i.e., when a location near the second opening $8k_2$ is communicated with the first communicating passage 23. In accordance with this embodiment, the groove width and the groove depth are increased in sequence from the second opening $8k_2$ toward the fourth opening $8k_4$ and concurrently the connecting portion between each of the openings is not formed as a stepped shape, but formed into a tapered shape, so that when the rotating position of the rotor 8 is moved gradually to a high degree of opening as shown in FIGS. 22B and 22C, the foreign materials x are pushed by a pressure of hot water and moved easily up to the position of the fifth opening $8k_5$, the foreign materials X pass within the rotor 8 and are discharged toward the outlet pipe 11.

Figure 23A:
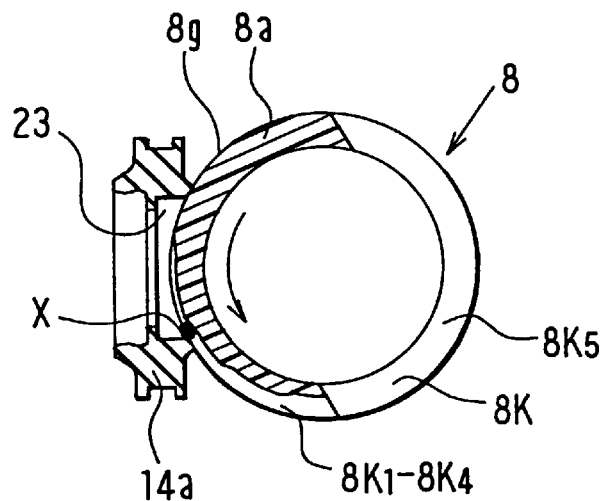
FIGS. 23A to 23C are cross sectional views for showing the rotor 8, which illustrates a discharging characteristic of the foreign materials in the fourth embodiment.
Figure 23B:
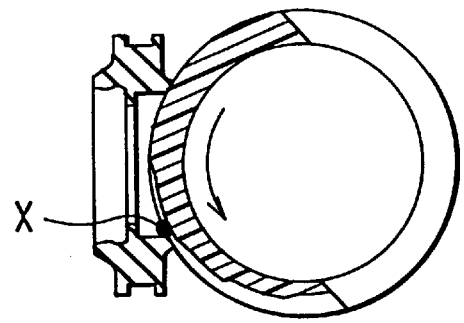
Figure 23C:
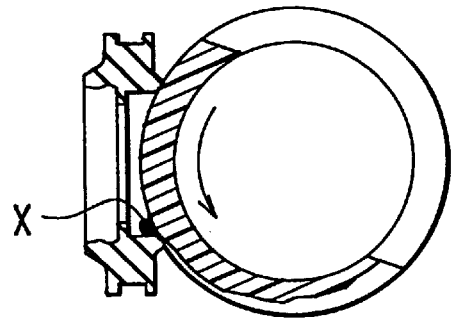

FIGS. 23A, 23B and 23C illustrate, opposite to FIG. 22, the case in which a rotating position of the rotor 8 is rotated from the position of the small opening degree to the full-closed position. Also in this case, a connecting portion between each of the openings and a connecting portion between the first opening $8k_1$ and an outer circumferential surface of the side wall portion $8a$ is not formed into a stepped portion, but formed into a tapered shape, and a cross section of each of the openings is formed into either an arcuate shape or a triangle shape shown in FIG. 21. Therefore, the foreign materials X once flowed into a location near the second opening $8k_2$ can be pushed easily onto the outer circumferential surface of the side wall portion $8a$ through the first opening $8k_1$.

A fifth embodiment of the present invention will be described.

Figure 25:
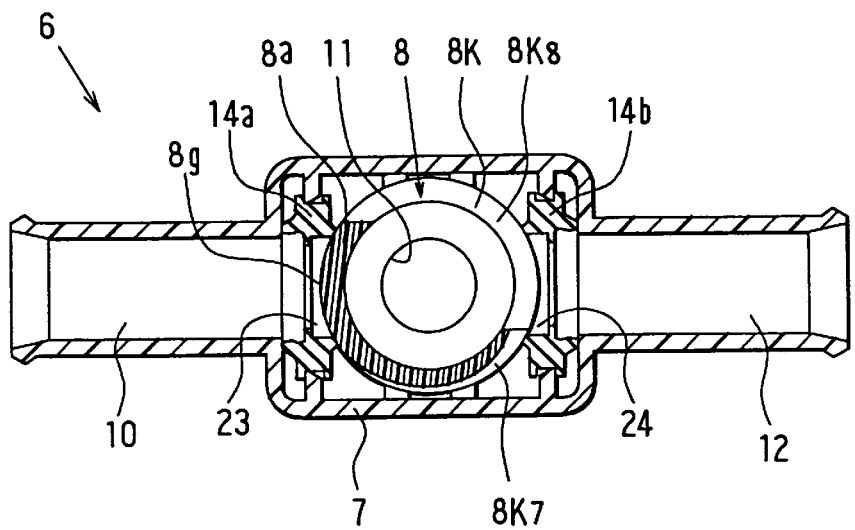
FIG. 25 is a cross sectional view for showing the flow control valve 6 of a fifth embodiment of the present invention.
Figure 26A:
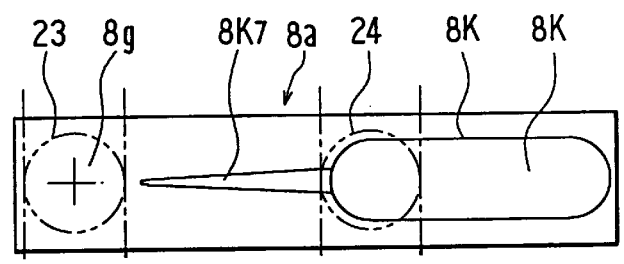
FIGS. 26A to 26D are developed views for showing the rotor 8 of the fifth embodiment;.
Figure 26B:
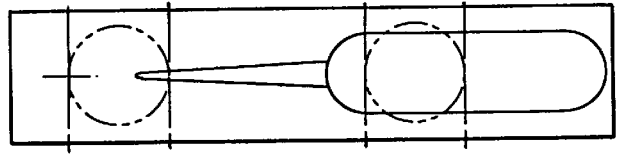
Figure 26C:
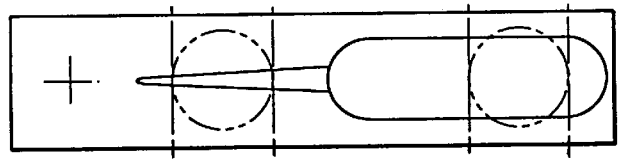
Figure 26D:
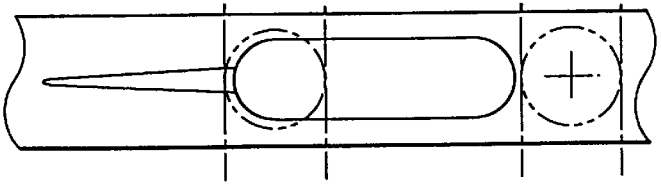
Figure 27:
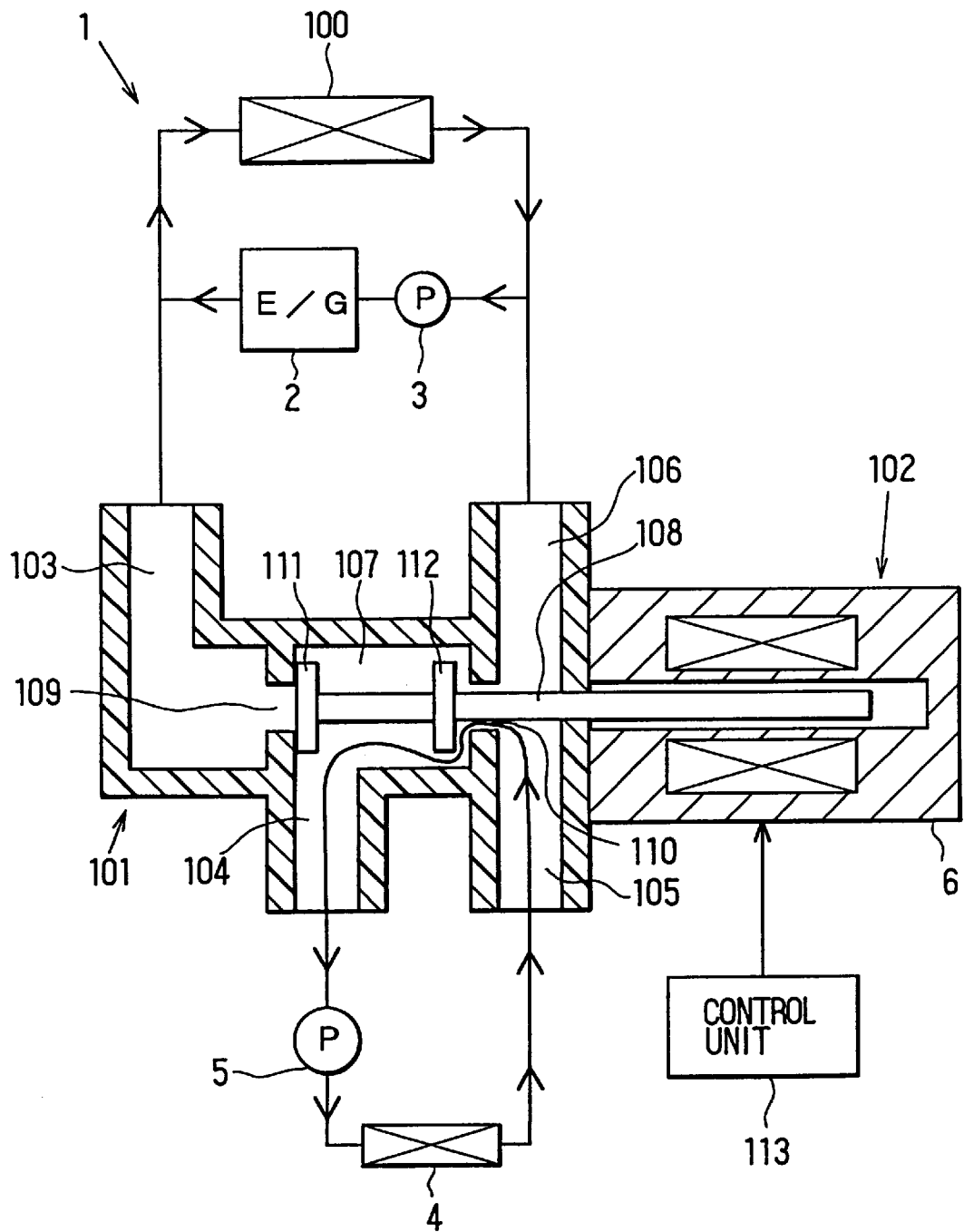
FIG. 27 is a schematic diagram showing an entire construction of a conventional flow control device.
Figure 28:
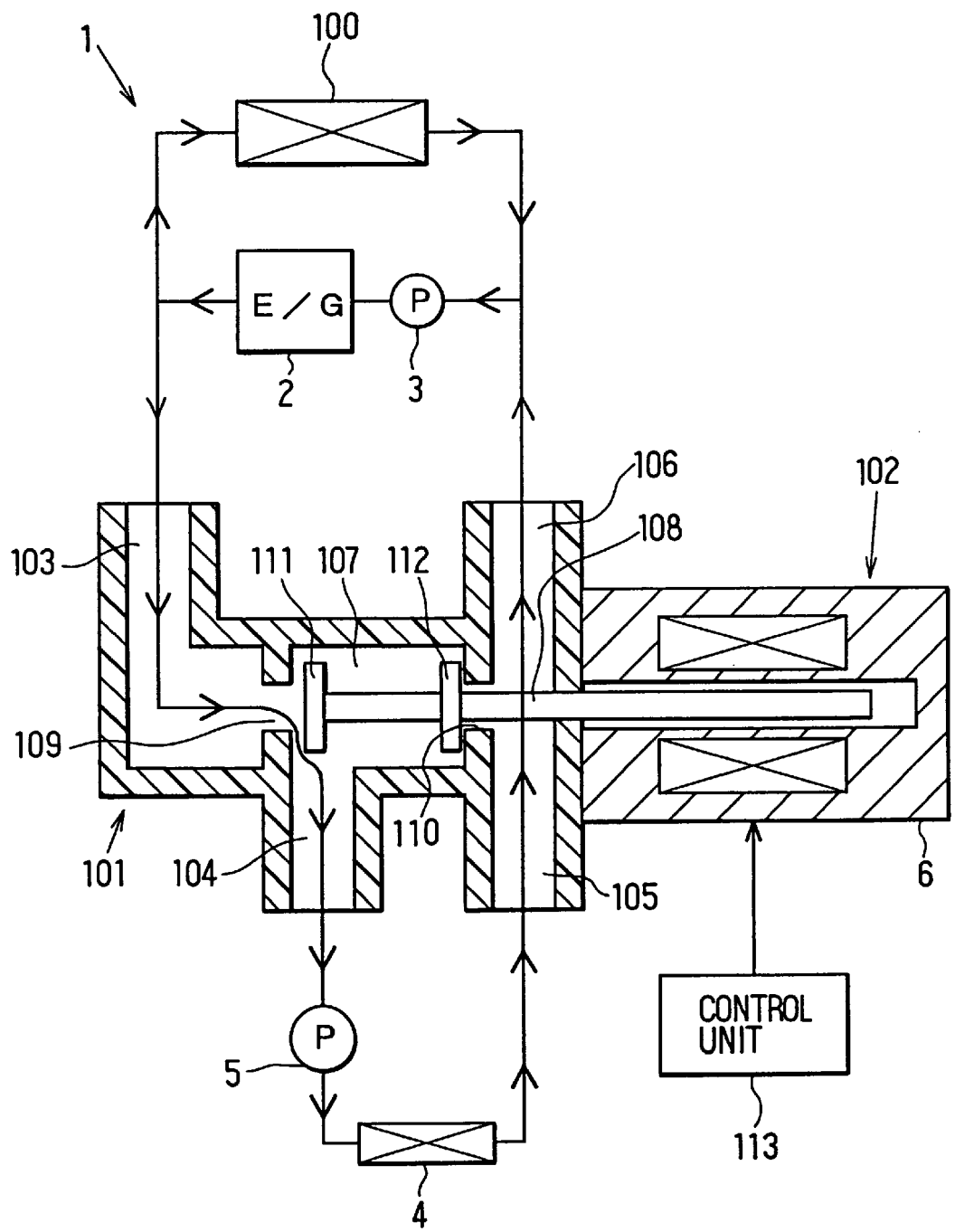
FIG. 28 is another schematic diagram showing an entire construction of the conventional flow control device.

In the aforesaid fourth embodiment, the groove width and the groove depth (in other words, an opening area) of each of the first opening $8k_1$ to the fourth opening $8k_4$ formed of a groove shape in the opening $8k$ are gradually increased in sequence in a stepwise manner from the first opening $8k_1$ toward the fourth opening $8k_4$. However, in the fifth embodiment, as shown in FIGS. 25 and 26, the opening $8k$ is composed of the first opening $8k_7$ formed of the groove shape and the second opening $8k_8$ formed of a through-hole and the groove width and the groove depth (in other words, an opening area) of the first opening $8k_7$ are increased continuously in sequence toward the second opening $8k_8$.

That is, the first opening $8k_7$ is formed such that the groove width and the groove depth of portions corresponding to the first opening $8k_1$ to the fourth opening $8k_4$ formed of the groove shape of the fourth embodiment are increased continuously, thereby further improving a discharging characteristic of the foreign materials X. In addition, the second opening $8k_8$ is the same as the fifth opening $8k_5$ of the fourth embodiment.

Even in the fifth embodiment, a cross sectional shape of the first opening $8k_7$ is preferably formed into either an arcuate shape or a triangular shape shown in FIG. 21.

Further, although the rotor 8 employed as valve body in the above embodiments is of a rotary type in which the rotor is rotated in the valve housing 7, the valve body may be of a reciprocating type in which the valve body is reciprocated in the valve housing 7.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A flow control device for controlling fluid flowing in a fluid passage, comprising:

a valve body disposed within said fluid passage, said valve body having a shutoff portion for prohibiting flow of fluid and a first and a second opening for allowing flow of the fluid, said second opening being smaller than said first opening, said valve body being movable between a first position in which said fluid passage is fully closed by said shutoff portion, a second position in which said fluid passage is opened by said first opening and a third position in which said fluid passage is opened by said second opening;

valve body operating means for moving said valve body between said first, second and third positions; and control means for electrically performing a first duty control for said valve body operating means, said first duty cycle comprising repeated movement of said valve body between said first position and said third position, said valve body remaining in said first position for a first specified time period and said valve body remaining in said third position for a second specified time period.

2. A flow control device according to claim 1, wherein, said valve body has a third opening for allowing flow of said fluid, said third opening being larger than said second opening and smaller than said first opening, said valve body being movable to a fourth position in which said fluid passage is opened by said third opening, and said control means electrically performs a second duty control for said valve body operating means, said second duty cycle comprising repeated movement of said valve body between said third position and said fourth position, said valve body remaining in said third position for a third specified time period and said valve body remaining in said fourth position for a fourth specified time period.

3. A flow control device according to claim 2, wherein said control means electrically performs a third duty cycle for said valve body operating means, said third duty cycle comprising repeated movement of said valve body between said second position and said fourth position, said valve body remaining in said second position for a fifth specified time period and said valve body remaining in said fourth position for a sixth specified time period.

4. A flow control device according to claim 1, further comprising:

a valve housing forming a part of said fluid passage, wherein, said valve body includes a rotor disposed rotatably in a direction crossing said fluid passage, said rotor defining said shut-off portion, said first opening and said second opening.

5. A flow control device according to claim 1, wherein said second opening is formed as an independent opening corresponding to said third position.

6. A flow control device according to claim 5, wherein, said independent opening has a size through which foreign matter in said fluid passes.

7. A flow control device according to claim 1, wherein said second opening includes a groove formed along an outer surface of said valve body.

8. A flow control device according to claim 7, wherein a groove width and a groove depth of said groove are increased stepwise from said third position to said second position.

9. A flow control device according to claim 8, wherein each stepwise increase of said groove width and said groove depth is formed as a tapered portion.

10. A flow control device according to claim 7, wherein a groove width and a groove depth of said groove are increased continuously from said third position to said second position.

11. A flow control device according to claim 7, wherein said groove is formed in an arcuate shape.

12. A flow control device according to claim 7, wherein said groove is formed in a triangular shape.

13. A flow control device according to claim 1, further comprising:

an inlet pipe;

an outlet pipe; and a bypass pipe, wherein when said valve body is in said first position, said shut off portion of said valve body shuts off the fluid passage between said inlet pipe and said outlet pipe and said first opening of said valve body opens the fluid passage between said bypass pipe and said outlet pipe;

when said valve body is in said second position, said second opening of said valve body opens the fluid passage between said inlet pipe and said outlet pipe and said shut off portion of said valve body shuts off the fluid passage between said bypass pipe and said outlet pipe, and when said valve body is in said third position, said second opening of said valve body opens the fluid passage between said inlet pipe and said outlet pipe and said first opening of said valve body opens said fluid passage between said bypass pipe and said outlet pipe.

14. A flow control device for controlling fluid flowing in a fluid passage, comprising:

a valve body disposed within said fluid passage, said valve body having a shutoff portion for prohibiting flow of fluid and a first and a second opening for allowing flow of the fluid, said second opening being smaller than said first opening, said valve body being movable between a first position in which said fluid passage is fully closed by said shutoff portion, a second position in which said fluid passage is opened by said first opening and third position in which said fluid passage is opened by said second opening;

valve body operating means for moving said valve body between said first, second and third positions; and control means for electrically performing a first duty control for said valve body operating means, said first duty cycle comprising repeated movement of said valve between said second position and said third position, said valve body remaining in said second position for a first specified time period and said valve body remaining in said third position for a second specified time period.

15. A flow control device according to claim 14, wherein, said valve body has a third opening for allowing flow of said fluid, said third opening being smaller than said second opening, said valve body being movable to a fourth position in which said fluid passage is opened by said third opening, and said control means electrically performs a second duty control for said valve body operating means, said second duty cycle comprising repeated movement of said valve body between said fourth position and said first position, said valve body remaining in said fourth position for a third specified time period and said valve body remaining in said first position for a fourth specified time period.

16. A flow control device according to claim 15, wherein, said third opening has a size through which foreign matter in said fluid passes.

17. A flow control device according to claim 14, further comprising:

a valve housing forming a part of said fluid passage, wherein, said valve body includes a rotor disposed rotatably in a direction crossing said fluid passage, said rotor defining said shut-off portion, said first opening and said second opening.

18. A flow control device according to claim 14, wherein said second opening is formed as an independent opening corresponding to said third position.

* * * * *